April 29, 1930.    N. H. WILKE ET AL    1,756,413
BALL BEARING SWING HINGE
Filed July 3, 1928
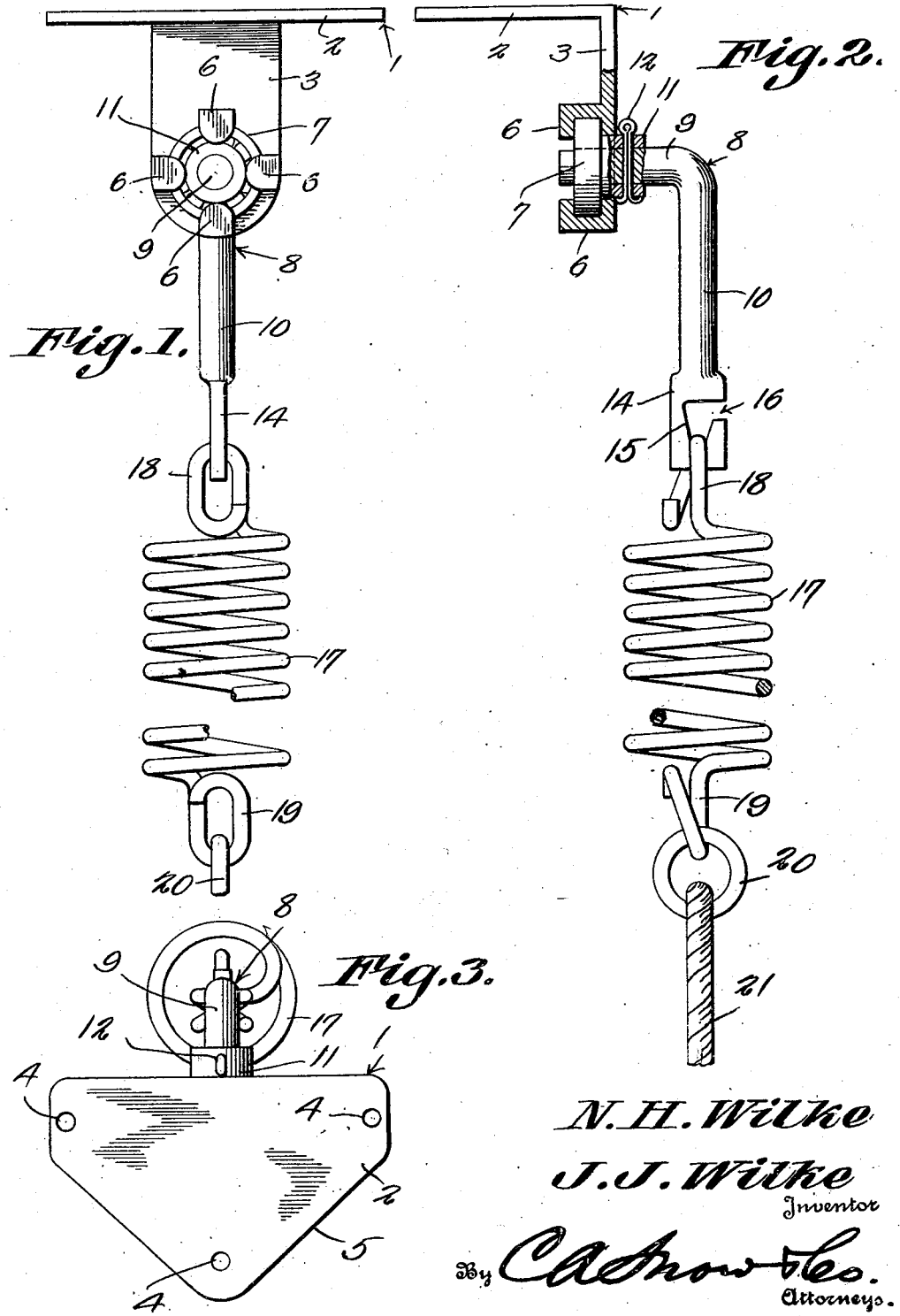
N. H. Wilke
J. J. Wilke
Inventor Patented Apr. 29, 1930

1,756,413

UNITED STATES PATENT OFFICE

NORMAN H. WILKE AND JOHN J. WILKE, OF TOLEDO, OHIO

BALL-BEARING SWING HINGE

Application filed July 3, 1928. Serial No. 290,216.

This invention aims to provide a simple means whereby porch swings and the like may be supported resiliently, the construction being strong and secure, notwithstanding the fact that a ball bearing is used, and it being highly improbable that the device hereinafter described will break apart, let the swing fall, and dump the occupant of the swing.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1 shows in front elevation, a device constructed in accordance with the invention;

Figure 2 is an elevation wherein the structure is viewed at right angles to the showing of Figure 1, parts being in section; and Figure 3 is a top plan.

The device forming the subject matter of this application is made of metal and includes an angle bracket, which, as a whole, is marked by the numeral 1. The bracket 1 includes a horizontal attaching flange 2, and a depending vertical flange 3. The horizontal flange 2 is considerably wider than the vertical flange 3, in order to provide ample means whereby the device hereinafter described may be suspended from an overhead support (not shown). The flange 2 has any desired number of openings 4, for the reception of securing elements (not shown) whereby the angle bracket 1 is held in place. The flange 2 of the angle bracket 1 preferably tapers rearwardly, as shown at 5 in Figure 3.

The vertical flange 3 of the angle bracket 1 is supplied near to its lower end with a plurality of angular fingers 6, which may be arranged in pairs, the fingers of each pair being disposed opposite to each other, as Figure 1 will show.

A ball bearing 7 is held against the flange 3 by the fingers 6. The fingers 6 are on the back side of the flange 3, and this puts both the fingers 6 and the ball bearing 7 underneath the horizontal flange 2. The fingers 6, and the ball bearing 7, therefore are protected and are so located that they will not receive accidental blows, as would be the case if they were on the outside of the flange 3 rather than on the back side of it. The numeral 8 marks a suspension member, which is of angular outline. The suspension member 8 comprises a shaft 9 and a shank 10 disposed at right angles to the shaft. The shaft 9 extends through the ball bearing 7. The ball bearing 7 includes a collar 11 in which the shaft 9 of the suspension member 8 is immediately received, the collar 11 being mounted to turn on the vertical flange 3 of the bracket 1 and upon the balls of the bearing 7. In order to hold the shaft 9 of the suspension member 8 in the collar 11, for rocking movement therewith, a cotter pin 12, or other fastening device, is extended through the collar 11 and through the shaft 9.

The lower end of the shank 10 of the suspension member 8 is flattened to form a plate 14 in which there is a V-shaped seat 15. There is an entering slot 16 at one edge of the plate 14 and the slot 16 communicates with the seat 15 at the upper end of the seat.

The numeral 17 marks a retractile coiled spring, of any desired length. The spring 17 has been broken away in Figures 1 and 2 so that those figures can be drawn on a large scale, and Figures 1 and 2 will indicate that the manufacturer can make the spring 17 as long as he wishes it to be. At the upper end of the spring 17 there is an eye 18 which can be engaged in the seat 15 through the slot 16. At the lower end of the spring 17 there is an eye 19, preferably constructed like the eye 18, and adapted to be engaged in a ring 20 carrying the cable 21 which suspends the porch swing.

The swing is yieldably supported owing to the presence of the spring 17. The parts 10 and 17 can swing like a pendulum, with the shaft 9 as a center of swinging movement. A very secure mounting for the shaft 9 is provided, because the shaft is held in the collar 11 of the ball bearing 7, and because the ball bearing is retained within the fingers 6.

Having thus described the invention, what is claimed is:—

1. In a swing hinge, an angle bracket including a horizontal flange and a depending flange, the depending flange being provided on its inner side with fingers, an anti-friction bearing retained by the fingers, and a suspension member including a shank and an arm located at an angle to each other, the shank being located on the outer side of the depending flange, the shaft being mounted to rock in the anti-friction bearing, the fingers, the bearing, and the inner end of the shaft, being disposed beneath the horizontal flange.

2. In a swing hinge, a bracket including a substantially vertical flange, an anti-friction bearing, and means for mounting the bearing on one side of the flange, the bearing including a collar extended through the flange and journaled therein, a suspension member including a shank and a shaft disposed at an angle to each other, the shaft extending through the collar and into the bearing, and a fastening device located on the opposite side of the flange from the bearing and passing through the collar and the shaft.

In testimony that we claim the foregoing as our own, we have hereto affixed our signatures.

NORMAN H. WILKE.
JOHN J. WILKE.